UNITED STATES PATENT OFFICE.

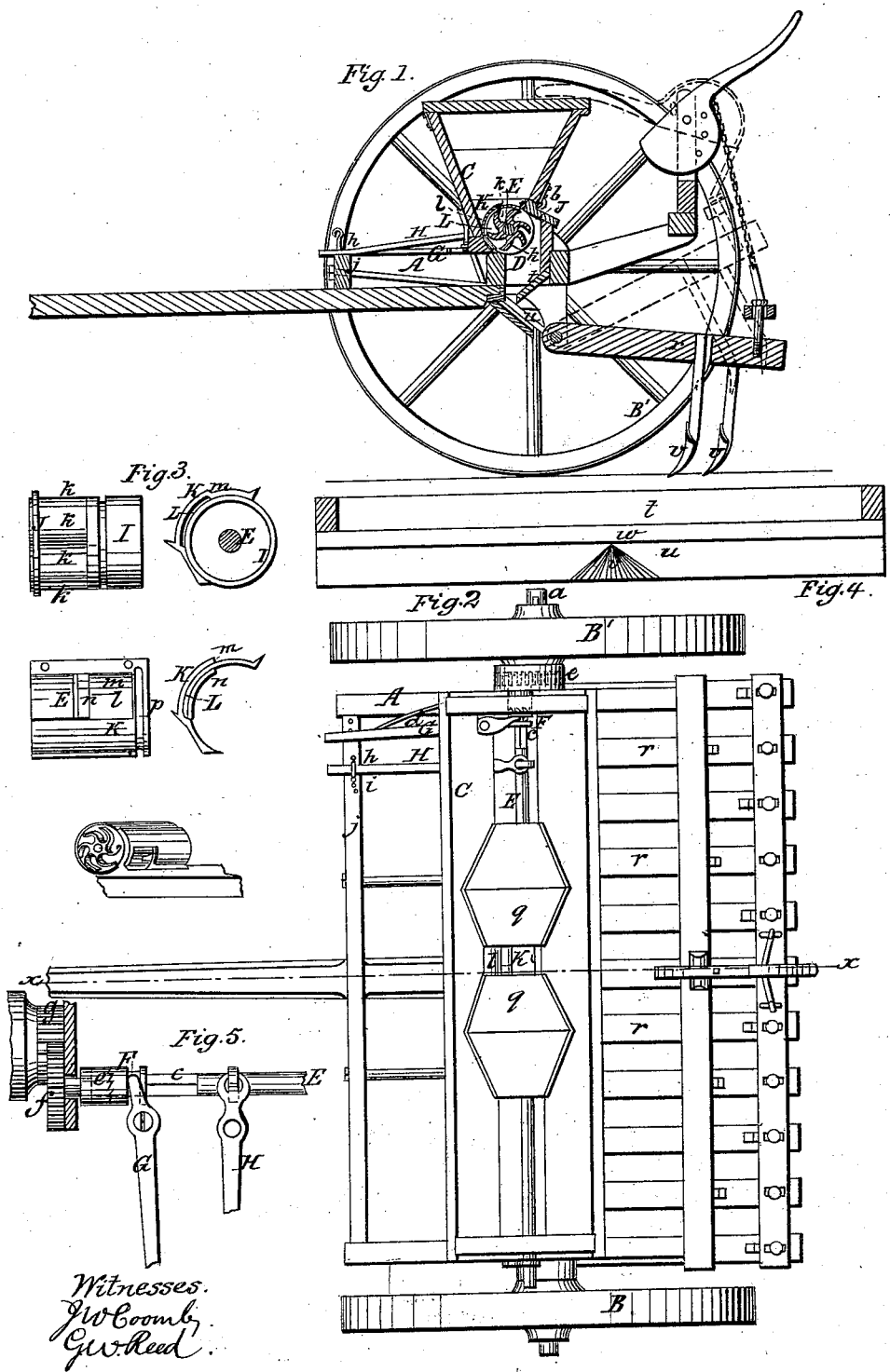

W. M. JONES AND S. E. TYLER, OF HORICON, WISCONSIN.

IMPROVEMENT IN SEEDING-MACHINES.

Specification forming part of Letters Patent No. 36,159, dated August 12, 1862.

*To all whom it may concern:*

Be it known that we, W. M. JONES and S. E. TYLER, both of Horicon, in the county of Dodge and State of Wisconsin, have invented a new and Improved Seeding-Machine; and we do hereby declare that the following is a full, clear, and exact description of the same, reference being had to the accompanying drawings, making a part of this specification, in which—

Figure 1 is a side sectional view of our invention, taken in the line $x\ x$, Fig. 2. Fig. 2 is a plan or top view of the same; Fig. 3, detached views of the seed-distributing device; Fig. 4, a detached view of the scattering-boards; Fig. 5, a detached view of the driving mechanism which operates the seed-distributing device.

Similar letters of reference indicate corresponding parts in the several figures.

This invention relates to a new and improved seeding-machine for sowing seed broadcast; and it consists in a novel and improved means for discharging the seed from the seed-box or hopper, as hereinafter fully shown and described, whereby the discharge of the seed may be graduated, as desired, so as to sow a greater or less quantity on a given area, and the seed-distributing apparatus prevented from becoming chocked or clogged, and the seed also prevented from being broken or bruised in being discharged, and at the same time scattered or sown in a perfect broadcast manner.

To enable those skilled in the art to fully understand and construct our invention, we will proceed to describe it.

A represents a rectangular frame, which is mounted on two wheels, B B′, placed loosely on arms or axles $a\ a$; and C is a seed-box or hopper, which extends the whole width of the frame A, and is connected at its back part by hinges $b$ to a box, D, which is secured permanently to the frame A, and also extends its whole width, so that the seed-box C, when closed down upon it, will register therewith, the two forming one box, in which the seed-distributing mechanism is placed.

E is a shaft, which runs longitudinally through the box D, and is allowed to slide longitudinally in its bearings. This shaft, near one end, has a square, $c$, formed on it, on which a clutch, F, is fitted, provided at one side with ratchet-teeth. This clutch has a lever, G, connected with it, against which a spring, $d$, bears, the spring having a tendency to keep the clutch engaged with ratchet-teeth on a collar, $e$, which is placed loosely on the shaft E, and has a pinion, $f$, attached to it, which gears into teeth $q$ on the hub of wheel B′. When the clutch F is engaged with the collar $e$ the shaft E will be rotated from the wheel B′ as the machine is drawn along, and said shaft may be rendered inoperative at any time or prevented from rotating by throwing the clutch F out of gear with the collar $e$, as will be fully understood by referring to Fig. 5.

H is a lever, which is connected to the shaft E for the purpose of moving it longitudinally. The outer part of this lever projects over the front part of the frame A, and may be secured at any desired point by a pin, $h$, which passes through it and into any one of a series of holes, $i$, made in the front cross-bar, $j$, of frame A. The object of thus adjusting or moving the shaft E will be presently explained.

On the shaft E there is placed and permanently attached a cylinder, I, which has a series of curved buckets, $k$, attached to it, the form of which is clearly shown in Fig. 1. These buckets extend outward to the periphery of the cylinder I, and on the buckets there is fitted a head, J, which is formed of a circular plate having curved slots made in it corresponding to the curvature of the buckets and a central hole to allow the buckets and shaft to pass through it, the head fitting snugly to the buckets and shaft, but the latter at the same time being allowed to slide freely through it.

K represents a curved plate, of semi-cylindrical form, which covers the upper part of the cylinder I and buckets K. This semi-cylinder K is secured to the upper part of the box D, and it has a square opening, $l$, made in it, as shown clearly in Fig. 3. The inner surface of the semi-cylinder K has not a uniform surface, a longitudinal groove or recess, $m$, being made in it to receive a curved plate, L, which may be termed a "gate," and which is allowed to slide laterally in the semi-cylinder. This gate L is provided with a ledge, $n$, at its inner side, which fits in a groove, $o$, made circumferentially in the cylinder I, and thereby causes the gate to be connected to said cylinder so as to move with it.

The head J is not allowed to slide or move with the shaft E, but rotates it. It is prevented from sliding with the shaft E in consequence of having its periphery fitted in a groove, *p*, in the inner surface of the semi-cylinder K, near one end of it.

When the gate L is fitted in the semi-cylinder K the inner surface of the latter and gate form a curved surface concentric with the cylinder I and buckets *k*, as shown clearly in Figs. 1 and 3.

In the bottom of the seed-box C there are placed double inclined planes *q q*, which form a bottom for the same and cause the seed to be presented or conducted to the opening *l* in the semi-cylinder K, as will be seen by referring to Fig. 2, a space being allowed between the ends of the inclined planes.

To the frame A there are attached a series of bars, *r*, provided with narrow teeth *s*, for covering the seed. Any proper seed-covering device may be employed, and it will be understood that, although only one seed-distributing device is described, a series of them are used, placed side by side.

The lower part of the box D is inclined, as shown at *t* in Fig. 1, and immediately below *t* there is placed another inclined board, *u*, the latter being inclined in a reverse position to the former, and so placed in relation to it that it will receive the seed therefrom. The inclined board *u* has its upper surface or face side provided with a series of grooves, *v*, which radiate from centers *w* at its upper edge, and which are at points in line with the buckets *k*.

The operation is as follows: As the machine is drawn along the shaft E is rotated from the wheel B'—that is, if the clutch F is in gear with the collar *e* of pinion *f*—and the seed in the seed-box C passes through the opening *l* in the semi-cylinder K, and the buckets *k*, which rotate with shaft E, catch the seed and carry the same upward within the semi-cylinder K and discharge the same as they pass over behind the shaft, the seed being discharged on the inclined bottom *t*, and thence on the inclined board *u*, from which it falls upon the ground in a scattered or broadcast state.

The head J, it will be seen, serves as a partition at one end of the buckets, while the cylinder I serves as a partition at the opposite end, and the quantity of seed discharged may be regulated as desired by shifting or moving the shaft E laterally, so that the gate L, which moves with the cylinder I, may cover more or less of the opening *l* of the semi-cylinder K. This gate L also performs another important function—to wit, it admits of a space between the edges of the buckets *k* and the inner surface of the semi-cylinder above the opening *l*, so that the grain will not wedge between the buckets and the semi-cylinder, and the seed-distributing device therefore cannot become choked or clogged, nor the seed bruised nor broken.

Having thus described our invention, what we claim as new, and desire to secure by Letters Patent, is—

1. The cylinder I, with the curved buckets *k* attached, secured to a rotating and sliding or longitudinally-adjustable shaft, E, in connection with the stationary head J and semi-cylinder K, provided with an opening, *l*, all being arranged within a suitable box, D, and in such relation with a seed-box, C, as to operate in the manner and for the purpose herein set forth.

2. The curved plate or gate L, placed or fitted within the semi-cylinder K, connected to the cylinder I, and arranged in relation with the opening *l* of the semi-cylinder K and the buckets *k*, to operate as and for the purpose specified.

3. The arrangement of the clutch F, collar *e*, pinion *f*, and shaft E, as shown and described, for the purpose of admitting of said shaft being thrown in and out of gear with the wheel B', and also admitting of said shaft being adjusted longitudinally when desired, as set forth.

WM. M. JONES.
S. E. TYLER.

Witnesses:
THOS. MACNEIL,
J. B. PHELPS.